(12) United States Patent
Saito et al.

(10) Patent No.: US 8,549,017 B2
(45) Date of Patent: Oct. 1, 2013

(54) INFORMATION PROCESSING APPARATUS AND METHOD, PROGRAM, AND RECORDING MEDIUM

(75) Inventors: Mari Saito, Kanagawa (JP); Noriyuki Yamamoto, Kanagawa (JP); Mitsuhiro Miyazaki, Kanagawa (JP); Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 11/780,999

(22) Filed: Jul. 20, 2007

(65) Prior Publication Data

US 2008/0016092 A1  Jan. 17, 2008

Related U.S. Application Data

(63) Continuation of application No. 10/849,059, filed on May 20, 2004, now Pat. No. 7,321,899.

(30) Foreign Application Priority Data

May 27, 2003  (JP) ................................. 2003-148593

(51) Int. Cl.
  *G06F 7/00* (2006.01)
(52) U.S. Cl.
  USPC .......................................... 707/754; 707/758
(58) Field of Classification Search
  USPC .............. 707/3–6, 100, 102, 104.1, 761, 706, 707/722, 736, 754, 758; 715/236; 709/217, 709/229, 204; 725/110, 46, 53
  See application file for complete search history.

(56) References Cited

U.S. PATENT DOCUMENTS

| | | | |
|---|---|---|---|
| 5,598,557 A | | 1/1997 | Doner et al. |
| 5,616,876 A | | 4/1997 | Cluts |
| 5,781,904 A | * | 7/1998 | Oren et al. ............................ 1/1 |
| 5,799,268 A | | 8/1998 | Boguraev |

(Continued)

FOREIGN PATENT DOCUMENTS

| | | |
|---|---|---|
| JP | 8-161343 | 6/1996 |
| JP | 2001-312515 | 11/2001 |
| JP | 2002-24270 | 1/2002 |
| JP | 2002-108888 | 4/2002 |

OTHER PUBLICATIONS

Alexandros Moukas et al., "Evolving a Multi-agent Information Filtering Solution in Amalthaea"; Agents '97 Conference Proceedings, 10 pages, 1997.

(Continued)

*Primary Examiner* — Hung T Vy
(74) *Attorney, Agent, or Firm* — Oblon, Spivak, McClelland, Maier & Neustadt, L.L.P.

(57) ABSTRACT

Disclosed herein are an information processing apparatus and method, a program, and a recording medium, in which a content is recommended to each user on the basis of even the metadata that is assigned with no classification. A metadata analysis block resolves metadata acquired by a metadata acquisition block into components. A dictionary data generation block generates dictionary data in which genre is correlated with keyword and each component. An associated information database generation block references the dictionary data to assign genre to the metadata which are assigned with no genre, thereby generating an associated information database of content. An associated information search block references the dictionary data to identify a genre from a keyword of interest data to search for associated information, thereby recommending content to the user. The present invention is applicable to personal computers or HDD recorders.

3 Claims, 14 Drawing Sheets

(56) References Cited

U.S. PATENT DOCUMENTS

| | | | |
|---|---|---|---|
| 5,873,107 A | 2/1999 | Borovoy et al. | |
| 6,011,895 A * | 1/2000 | Abecassis | 386/262 |
| 6,094,681 A | 7/2000 | Shaffer et al. | |
| 6,108,640 A | 8/2000 | Slotznick | |
| 6,134,548 A | 10/2000 | Gottsman et al. | |
| 6,141,662 A | 10/2000 | Jeyachandran | |
| 6,199,076 B1 | 3/2001 | Logan et al. | |
| 6,253,208 B1 | 6/2001 | Wittgreffe et al. | |
| 6,272,493 B1 | 8/2001 | Pasquali | |
| 6,311,194 B1 * | 10/2001 | Sheth et al. | 715/236 |
| 6,421,675 B1 | 7/2002 | Ryan et al. | |
| 6,434,745 B1 | 8/2002 | Conley et al. | |
| 6,442,549 B1 | 8/2002 | Schneider | |
| 6,493,702 B1 | 12/2002 | Adar et al. | |
| 6,499,029 B1 * | 12/2002 | Kurapati et al. | 707/750 |
| 6,629,106 B1 | 9/2003 | Narayanaswamy et al. | |
| 6,654,735 B1 * | 11/2003 | Eichstaedt et al. | 707/749 |
| 6,928,262 B1 * | 8/2005 | Kanemitsu | 455/3.06 |
| 6,978,274 B1 | 12/2005 | Gallivan et al. | |
| 6,983,483 B2 * | 1/2006 | Maze et al. | 725/53 |
| 7,073,193 B2 | 7/2006 | Marsh | |
| 7,107,271 B2 * | 9/2006 | Aoki et al. | 1/1 |
| 7,111,042 B2 * | 9/2006 | Kikugawa | 709/204 |
| 7,421,504 B2 * | 9/2008 | Imaida et al. | 709/229 |
| 2002/0038308 A1 | 3/2002 | Cappi | |
| 2002/0103920 A1 * | 8/2002 | Berkun et al. | 709/231 |
| 2002/0123928 A1 * | 9/2002 | Eldering et al. | 705/14 |
| 2002/0156760 A1 * | 10/2002 | Lawrence et al. | 707/1 |
| 2003/0093790 A1 | 5/2003 | Logan et al. | |
| 2003/0110507 A1 * | 6/2003 | Dimitrova et al. | 725/110 |
| 2003/0115191 A1 * | 6/2003 | Copperman et al. | 707/3 |
| 2003/0135513 A1 | 7/2003 | Quinn et al. | |
| 2003/0149687 A1 * | 8/2003 | Brown et al. | 707/3 |
| 2003/0163815 A1 * | 8/2003 | Begeja et al. | 725/46 |
| 2003/0177503 A1 * | 9/2003 | Sull et al. | 725/112 |
| 2004/0010564 A1 * | 1/2004 | Imaida et al. | 709/217 |
| 2004/0177063 A1 * | 9/2004 | Weber et al. | 707/3 |

OTHER PUBLICATIONS

Michael Fleming et al., "User Modeling in the Design of Interactive Interface Agents", Proceedings of UM99: 7$^{th}$ International Conference on User Modeling, pp. 67-76, Jun. 20-24, 1999.

* cited by examiner

F I G. 7

| COM-PONENT | GENRE | BROADCAST STATION | BROADCAST TIME ZONE | PERFORMER | KEYWORD | ... |
|---|---|---|---|---|---|---|
| No1 | COOKING | TCS | AFTERNOON | AAA | RECIPE, INGREDIENTS, STEPS, TELETEXT BROADCASTING, STEREO | ... |
| No2 | LIVING INFORMATION | MHK | EVENING | BBB | LEISURE, HOLIDAY RESORT, CHILDREN, TELETEXT BROADCASTING, STEREO | ... |
| No3 | CHILDREN | MHK | MORNING | CCC | LEISURE, CHILDREN, TELETEXT BROADCASTING, STEREO | ... |
| ... | ... | ... | ... | ... | ... | ... |

F I G. 8

| COM-PONENT | GENRE | BROADCAST STATION | BROADCAST TIME ZONE | PERFORMER | KEYWORD |
|---|---|---|---|---|---|
| No1-1 | COOKING | TCS | AFTERNOON | AAA | RECIPE, INGREDIENTS, STEPS, TELETEXT BROADCASTING, STEREO |
| No1-2 | COOKING | MHK | AFTERNOON | DDD | RECIPE, INGREDIENTS, STEPS, BOILED FOOD, TELETEXT BROADCASTING, STEREO |
| No1-3 | COOKING | MHK | MORNING | EEE | RECIPE, INGREDIENTS, STEPS, KITCHEN, TELETEXT BROADCASTING, STEREO |
| ... | ... | ... | ... | ... | ... |

F I G. 1 0

|   | KEYWORD | FREQUENCY/ MONTH | GENRE | OTHER COMPONENTS |
|---|---|---|---|---|
| 1 | RECIPE | 3 | COOKING | ... |
| 2 | INGREDIENTS | 7 | COOKING | ... |
| 3 | STEPS | 2 | COOKING | ... |
| 4 | LEISURE | 15 | LIVING INFORMATION, CHILDREN | ... |
| 5 | HOLIDAY RESORT | 3 | LIVING INFORMATION | ... |
| 6 | CHILDREN | 12 | LIVING INFORMATION, CHILDREN | ... |
| ⋮ | ⋮ | ⋮ | ⋮ | ⋮ |

F I G. 1 3

|  | JANUARY | FEBRUARY | MARCH | APRIL |
|---|---|---|---|---|
| FREQUENCY OF KEYWORD A | 12 | 15 | 11 | 45 |
| FREQUENCY OF KEYWORD B | 48 | 50 | 51 | 48 |

INFORMATION PROCESSING APPARATUS AND METHOD, PROGRAM, AND RECORDING MEDIUM

CROSS REFERENCE TO RELATED APPLICATIONS

This application is a continuation application of U.S. Ser. No. 10/849,059, filed May 20, 2004, now allowed, and claims the benefit of priority from prior Japanese Patent Application No. 2003 148593, filed May 27, 2003, the entire contents of each of which are incorporated herein by reference.

BACKGROUND OF THE INVENTION

The present invention relates generally to an information processing apparatus and method, a program, and a recording medium, and more particularly, to an information processing apparatus and method, a program, and a recording medium which are capable of recommending particular pieces of content to users on the basis of metadata even though they are assigned with no classification.

For methods of recommending television programs (or content), the initial interest registering method, the viewing log using method, and the coordination filtering method are known for example.

In any of these schemes, an electronic program guide (EPG) and program information (or program metadata) on the Web are used for the original data. Classifications of these three schemes depend on how to acquire data of user's preference to be matched with these pieces of information.

The initial interest registering method renders the user to register his favorite categories (drama, variety, etc.), his favorite genre names (drama, music, etc.), and his favorite television personalities for example at the starting of use. Subsequently, matching is made with program metadata with the registered information used as keywords, thereby program names to be recommended are acquired.

In the viewing log using method, every time the user views a program, the program metadata associated with the viewed program is accumulated, and when the viewing log (or program metadata) has been accumulated to a predetermined amount, this viewing log is analyzed to acquire program names to be recommended. Alternatively, instead of the viewing log, an operation log such as the preset recording or the start of recording done by the user may be used on devices in which recording is made on a hard disk drive for example. In this case, the information about programs which highly reflect user's interest can be acquired rather than vague information about programs.

In the coordination filtering method, a matching is made between one user's viewing (or operation) log and another user's viewing log to acquire the viewing log of another user similar to the user concerned in viewing log. Then, program names which have not been viewed by the user concerned are acquired from among the programs viewed by another user similar (in favorite) to the user concerned in viewing log, thereby recommending the acquired program names not viewed by the user concerned.

Use of any of the above mentioned program recommendation schemes allows the recommendation of the programs in which the user is interested.

However, these program recommendation schemes present problems that programs having similar names tend to be recommended because the interest of user is extracted from program metadata (namely, a biased interest in television programs is acquired), and generally popular names are used owning to the structure of program metadata.

To overcome these problems, the applicant hereof proposed a technology in which the electronic mail daily used by the user is analyzed to extract user's preference information, thereby executing content recommendation (refer to patent document 1 for example).

Patent document 1: Japanese Patent Laid open No. 2001 312515

However, the technology disclosed in patent document 1 presents a problem that it takes much labor for the analysis of the preference information and therefore it is difficult to easily and quickly execute content recommendation.

SUMMARY OF THE INVENTION

It is therefore an object of the present invention to provide an information processing apparatus and method, a program, and a recording medium which are capable of recommending particular pieces of content to users on the basis of metadata even though they are assigned with no classification.

In carrying out the invention and according to one aspect thereof, there is provided an information processing apparatus including: metadata acquisition means for acquiring metadata of content; metadata analysis means for analyzing an attribute of the metadata acquired by the metadata acquisition means; dictionary generation means for generating dictionary data for correlating the attribute with an attribute item contained in the attribute on the basis of an analysis result acquired by the metadata analysis means; and database generation means for assigning the attribute item to metadata acquired by the metadata acquisition means on the basis of the dictionary data generated by the dictionary data generation means, and storing the metadata assigned with the attribute item into a database.

The above mentioned dictionary generation means detects, from among words contained in the metadata, a word which is high in co occurrence in metadata having a particular attribute item as a keyword of the attribute item, thereby correlating the attribute item of the metadata with the keyword.

The above mentioned dictionary generation means deletes an unnecessary word included in the metadata.

The above mentioned database generation means assigns a genre to the metadata as the attribute item.

The above mentioned information processing apparatus further includes: extraction means for extracting interest data indicative of user's interest; search means for extracting a keyword from the interest data extracted by the extraction means, searching, on the basis of the keyword, the dictionary data generated by the dictionary generation means for acquiring a genre corresponding to the keyword, and searching, on the basis of the genre, the database generated by the database generation means; and presentation means for presenting information retrieved by the search means; wherein a user evaluation entered in response to the information presented by the presentation means is reflected on the extraction of the interest data.

The above mentioned metadata analysis means including: resolving means for resolving the metadata into components; and storage means for collecting the metadata resolved by the resolving means for each attribute item and storing the collected metadata.

On the basis of the components included in the metadata, the above mentioned database generation means complements a component which is not included in the metadata.

The above mentioned database generation means assigns, as the attribute, a popularity category to the metadata acquired by the metadata acquisition means.

The above mentioned dictionary generation means generates a dictionary of the popularity category on the basis of a keyword contained in the metadata, and the database generation means assigns the popularity category of the metadata on the basis of the dictionary.

On the basis of a keyword contained in the metadata, the database generation means assigns, as the attribute of the metadata, an association category for associating a plurality of attribute items associated with the keyword.

In carrying out the invention and according to another aspect thereof, there is provided an information processing method including the steps of: acquiring metadata of content; analyzing an attribute of the metadata acquired in the metadata acquisition step; generating dictionary data for correlating the attribute with an attribute item contained in the attribute on the basis of an analysis result acquired in the metadata analysis step; and generating a database by assigning the attribute item to metadata acquired in the metadata acquisition step on the basis of the dictionary data generated in the dictionary data generation step, and by storing the metadata assigned with the attribute item into a database.

In carrying out the invention and according to still another aspect thereof, there is provided a program for making a computer execute the controlling steps of: acquiring metadata of content; analyzing an attribute of the metadata acquired in the metadata acquisition step; generating dictionary data for correlating the attribute with an attribute item contained in the attribute on the basis of an analysis result acquired in the metadata analysis step; and generating a database by assigning the attribute item to metadata acquired in the metadata acquisition step on the basis of the dictionary data generated in the dictionary data generation step, and by storing the metadata assigned with the attribute item into a database.

In carrying out the invention and according to yet another aspect thereof, there is provided a recording medium recording a program for making a computer execute the controlling steps of: acquiring metadata of content; analyzing an attribute of the metadata acquired in the metadata acquisition step; generating dictionary data for correlating the attribute with an attribute item contained in the attribute on the basis of an analysis result acquired in the metadata analysis step; and generating a database by assigning the attribute item to metadata acquired in the metadata acquisition step on the basis of the dictionary data generated in the dictionary data generation step, and by storing the metadata assigned with the attribute item into a database.

In the information processing apparatus and method and program according to the present invention, the metadata of content are acquired, the attributes constituting the acquired content are analyzed, the dictionary data for correlating attributes with attribute items contained in these attributes are generated on the basis of a result of the analysis, the attribute items are assigned to the acquired metadata on the basis of the generated dictionary data, and the metadata assigned with the attribute items are stored.

BRIEF DESCRIPTION OF THE DRAWINGS

These and other objects of the invention will be seen by reference to the description, taken in connection with the accompanying drawings, in which:

FIG. 7 shows an exemplary configuration of metadata broken down into components;

FIG. 8 shows an exemplary configuration of metadata collected by genre;

FIG. 10 shows an exemplary configuration of dictionary data;

FIG. 13 shows an example of keyword monthly frequency; and

DETAILED DESCRIPTION OF THE PREFERRED EMBODIMENTS

This invention will be described in further detail by way of example with reference to the accompanying drawings. The correlation between the components of the claims herein and the particular examples in an embodiment of the invention is as follows. This description is intended to make sure that the particular examples supporting the invention written in the claims herein are written in an embodiment of the invention. Therefore, if there is a particular example which is described an embodiment of the invention but not described in the preferred embodiments here as one that corresponds to a component of the embodiment, it does not denote that this particular example does not correspond to that component. Conversely, if a particular example is described in the preferred embodiments here as corresponding to a component of an embodiment, it does not denote that this particular example does not correspond to any other components than that component.

Further, the above mentioned description does not denote that the invention corresponding to a particular example described in the preferred embodiments here is written in all claims herein. In other words, the above mentioned description is about the invention corresponding to a particular example described in the preferred embodiments herein and does not deny the existence of any invention that is not described in the claims herein, namely the existence of any invention that will be divisionally applied or added by amendment in the future.

Figure 4:
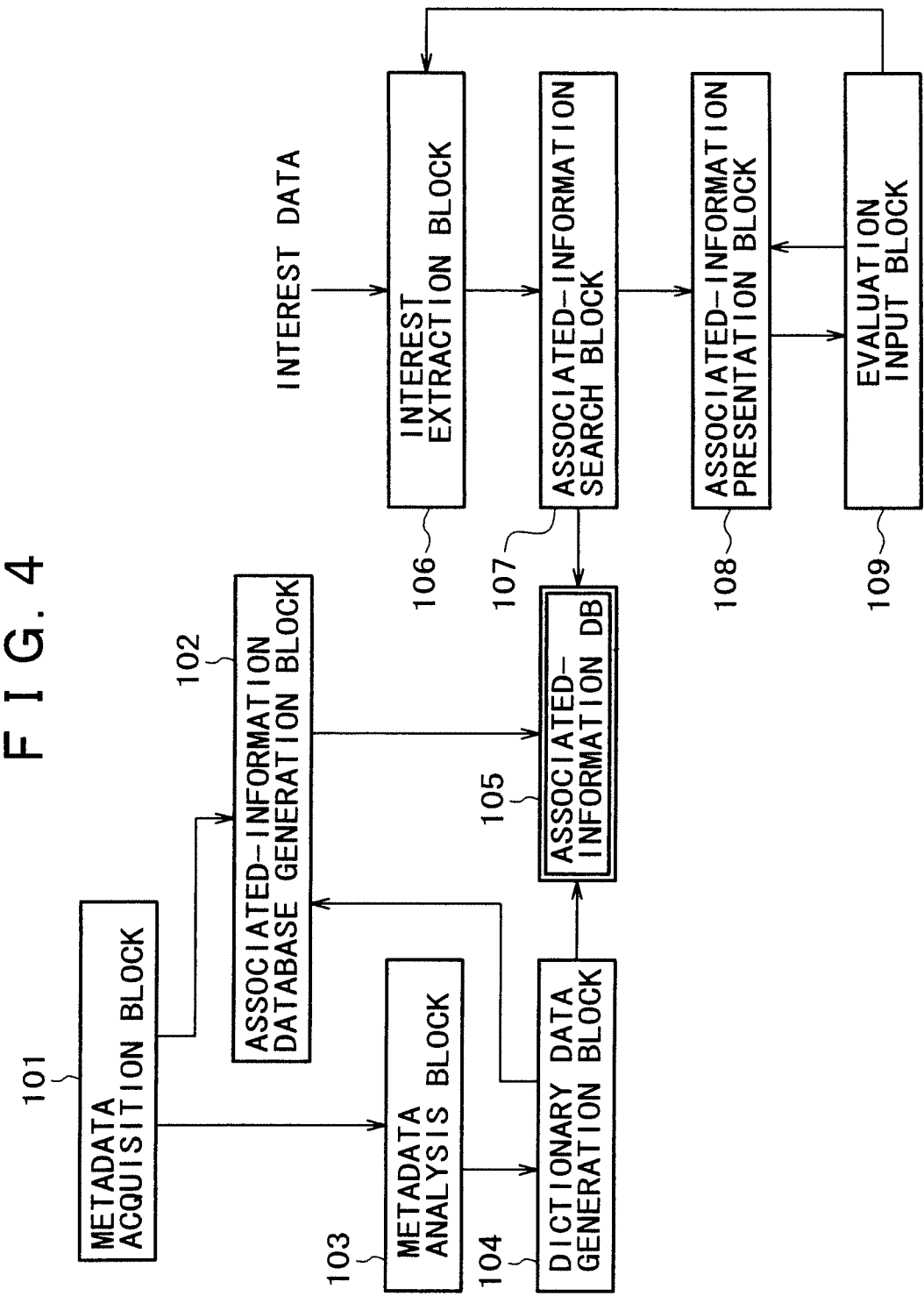
FIG. 4 is a block diagram illustrating an exemplary functional configuration of a CPU shown in FIG. 3.

An information processing apparatus recited in claim 1 herein includes metadata acquisition means (for example, a metadata acquisition block 101 shown in FIG. 4) for acquiring metadata of content; metadata analysis means (for example, a metadata analysis block 103 shown in FIG. 4) for analyzing an attribute of the metadata acquired by the metadata acquisition means; dictionary generation means (a dictionary data generation block 104 shown in FIG. 4) for generating dictionary data for correlating the attribute with an attribute item contained in the attribute on the basis of an analysis result acquired by the metadata analysis means; and database generation means (for example, an associated information database generation block 102 shown in FIG. 4) for assigning the attribute item to metadata acquired by the metadata acquisition means on the basis of the dictionary data generated by the dictionary data generation means and storing the metadata assigned with the attribute item into a database.

The information processing apparatus recited in claim 5 herein further includes: extraction means (for example, an interest extraction block 106 shown in FIG. 4) for extracting interest data indicative of user's interest; search means (for example, an associated information search block 107 shown in FIG. 4) for extracting a keyword from the interest data extracted by the extraction means, searching, on the basis of the keyword, the dictionary data generated by the dictionary generation means for acquiring a genre corresponding to the keyword, and searching, on the basis of the genre, the database generated by the database generation means; and presentation means (for example, an associated information presentation block 108 shown in FIG. 4) for presenting information retrieved by the search means; wherein a user evaluation entered in response to the information presented by the presentation means is reflected on the extraction of the interest data.

In the information processing apparatus recited in claim 6 herein, the metadata analysis means including: resolving means (for example, the metadata analysis block 103 shown in FIG. 4 for executing step S21 shown in FIG. 6) for resolving the metadata into components; and storage means (for example, the metadata analysis block 103 shown in FIG. 4 for executing step S23 shown in FIG. 6) for collecting the metadata resolved by the resolving means for each attribute item, and storing the collected metadata.

Figure 11:
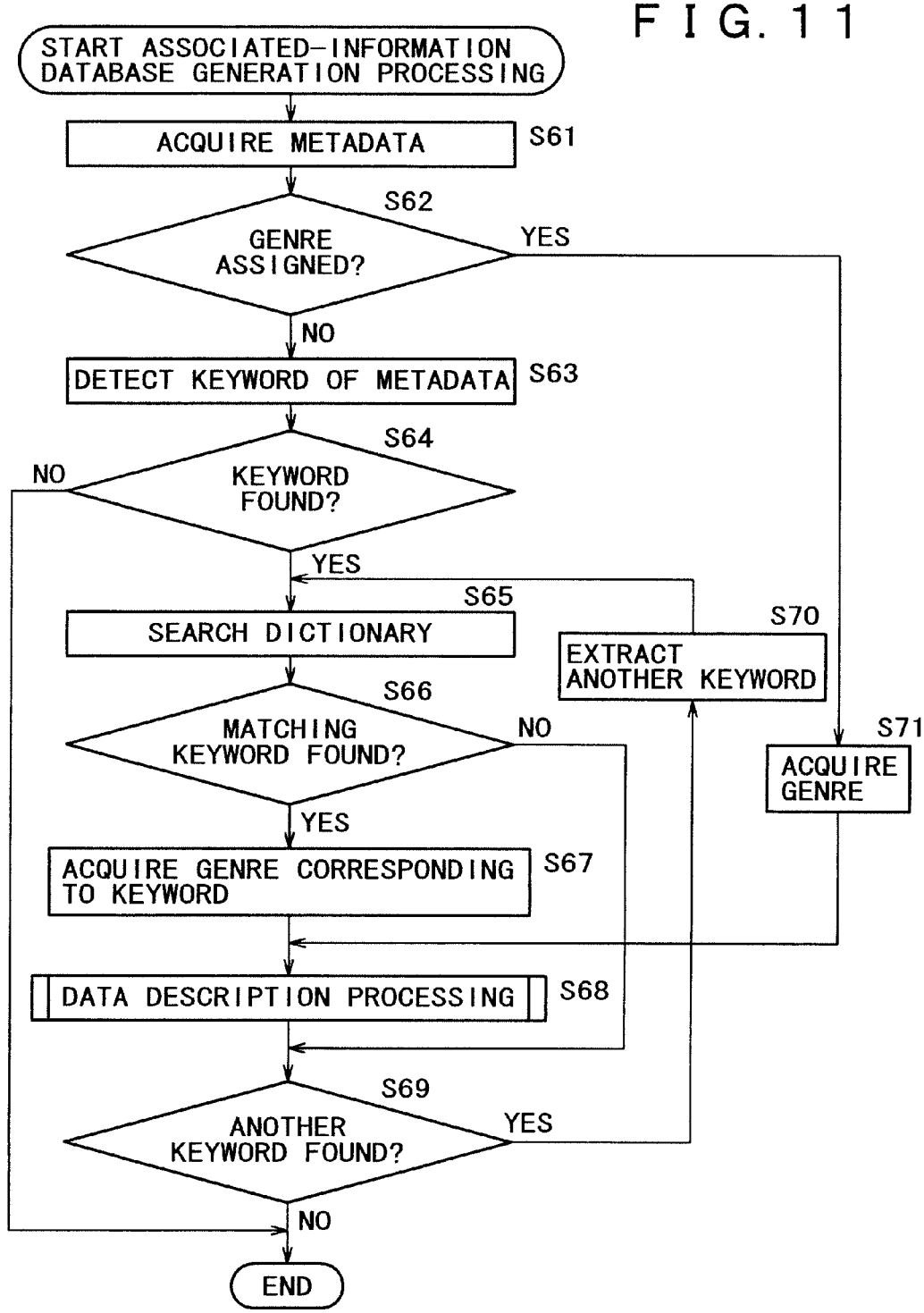
FIG. 11 is a flowchart describing associated information database generation processing.

An information processing apparatus recited in claim 11 herein includes the steps of: acquiring metadata of content (for example, step S1 shown in FIG. 5); analyzing an attribute of the metadata acquired in the metadata acquisition step (for example, step S2 shown in FIG. 5); generating dictionary data for correlating the attribute with an attribute item contained in the attribute on the basis of an analysis result acquired in the metadata analysis step (for example, step S3 shown in FIG. 5); and generating a database by assigning the attribute item to metadata acquired in the metadata acquisition step on the basis of the dictionary data generated in the dictionary data generation step, and by storing the metadata assigned with the attribute item into a database (for example, step S69 shown in FIG. 11).

A program recited in claim 12 herein for making a computer execute the controlling steps of: acquiring metadata of content (for example, step S1 shown in FIG. 5); analyzing an attribute of the metadata acquired in the metadata acquisition step (for example, step S2 shown in FIG. 5); generating dictionary data for correlating the attribute with an attribute item contained in the attribute on the basis of an analysis result acquired in the metadata analysis step (for example, step S3 shown in FIG. 5); and generating a database by assigning the attribute item to metadata acquired in the metadata acquisition step on the basis of the dictionary data generated in the dictionary data generation step, and by storing the metadata assigned with the attribute item into a database (for example, step S69 shown in FIG. 11).

A recording medium recited in claim 13 herein recording a program for making a computer execute the controlling steps of: acquiring metadata of content (for example, step S1 shown in FIG. 5); analyzing an attribute of the metadata acquired in the metadata acquisition step (for example, step S2 shown in FIG. 5); generating dictionary data for correlating the attribute with an attribute item contained in the attribute on the basis of an analysis result acquired in the metadata analysis step (for example, step S3 shown in FIG. 5); and generating a database by assigning the attribute item to metadata acquired in the metadata acquisition step on the basis of the dictionary data generated in the dictionary data generation step, and by storing the metadata assigned with the attribute item into a database (for example, step S69 shown in FIG. 11).

Figure 1:
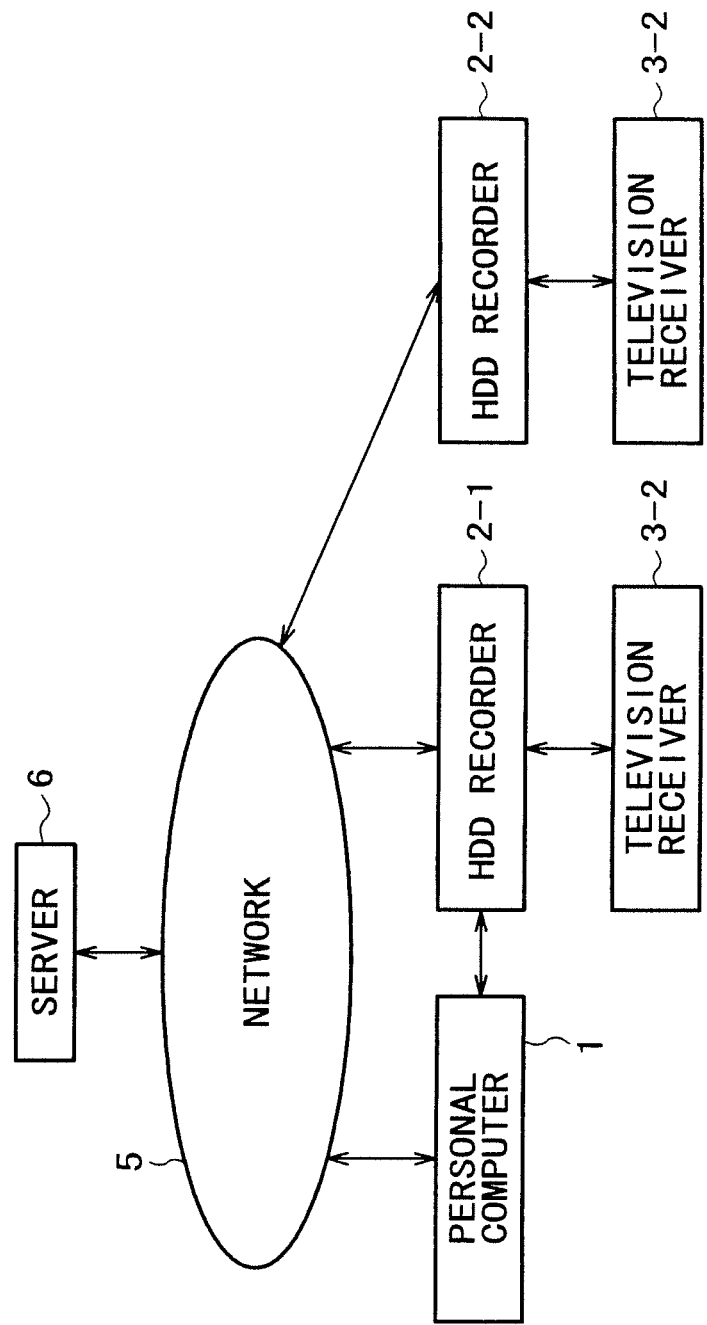
FIG. 1 is an exemplary configuration of a content search system practiced as one embodiment of the invention.

In what follows, one embodiment of the present invention will be described. Referring to FIG. 1, there is shown an exemplary configuration of an information processing apparatus to which the present invention is applied. In this exemplary configuration, a personal computer 1 which functions as a user terminal and hard disk drive (HDD) recorders 2 1 and 2 2 (these may be hereafter generically referred to as a HDD recorder 2 unless it is necessary to make a distinction between the two) are connected to a network 5. A server 6 which records interest data providing user's preference information and program metadata is also connected to the network 5. The personal computer 1 is connected through the HDD recorder 2 through Ethernet™ for example. Television receivers 3 1 and 3 2 (these may be hereafter generically referred to as a television receiver 3 unless it is necessary to make a distinction between the two) are connected to the HDD recorder 2 1 and the HDD recorder 2 2, respectively.

The information processing apparatus according to the invention may be configured by the personal computer 1 or may be configured by the HDD recorder 2 1 or the HDD recorder 2 2. Alternatively, the information processing apparatus according to the invention may be configured by the server 6.

The personal computer 1, the HDD recorders 2 1 and 2 2, and the television receivers 3 1 and 3 2 are owned by one user (or one family) and are arranged in proximity with each other. The network 5 may be either a LAN (Local Area Network) or a wide area network such as the Internet.

The personal computer 1 is an information processing apparatus which can execute a variety of application programs; for example, the personal computer 1 executes the sending/receiving of electronic mail, the browsing of Web pages, and the creation of documents. Also, the personal computer 1 extracts words corresponding to user's interests (hereafter appropriately referred to simply as words of interest) from documents received with the sending/receiving of electronic mail, thereby generating data of interest. On the basis of the data of interest, the personal computer 1 recommends to the user a particular piece of content which match the interest of the user.

The HDD recorder 2 records television programs on a mass storage hard disk drive and outputs recorded television programs to the television receiver 3 as specified by the user for reproduction. Also, the HDD recorder 2 acquires data of interest to recommend, for the user, programs which match the data of interest as will be described later with reference to FIG. 5.

Figure 2:
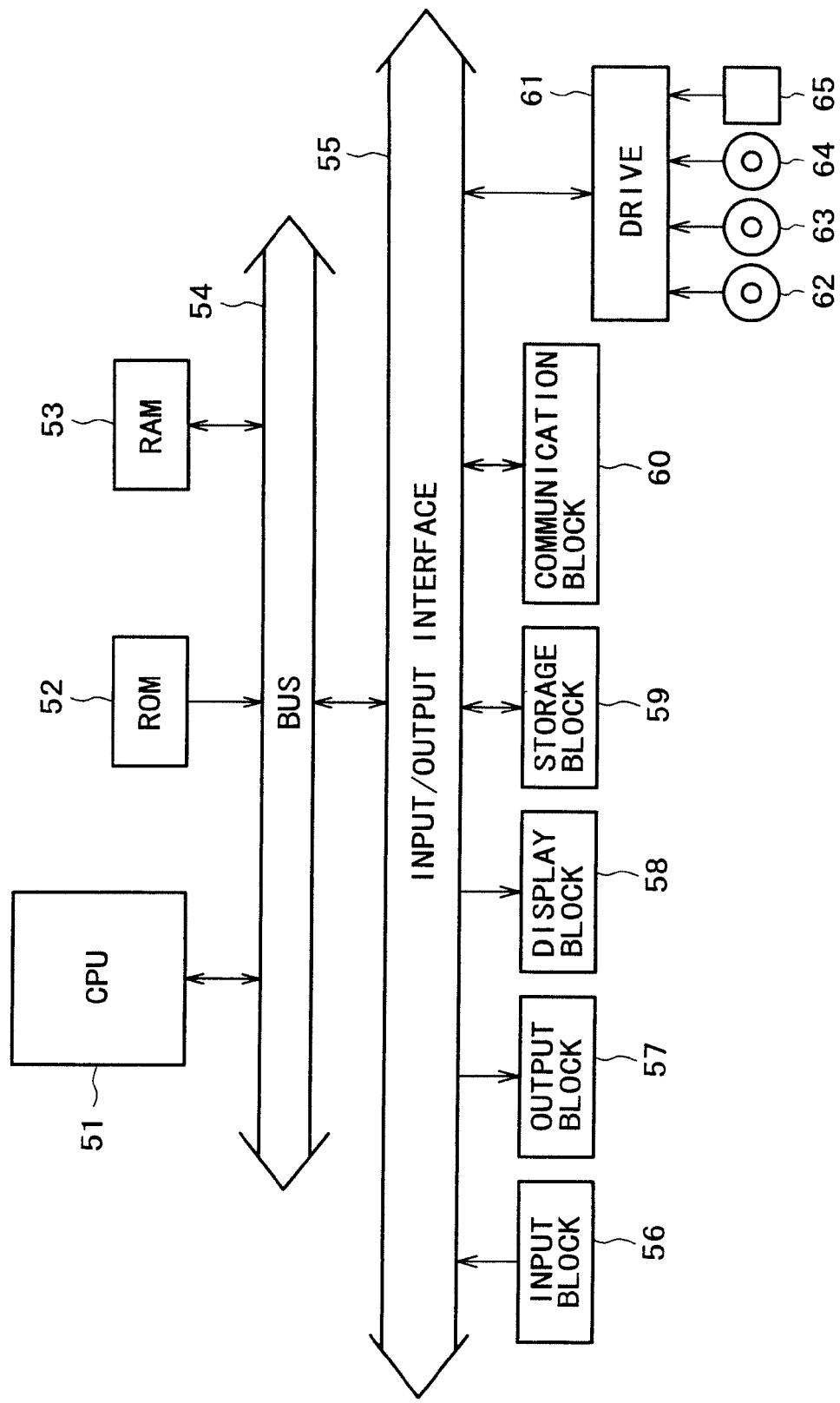
FIG. 2 is a block diagram illustrating an exemplary configuration of a personal computer shown in FIG. 1.

Referring to FIG. 2, there is shown a block diagram illustrating an exemplary configuration of the personal computer 1. It should be noted that this configuration is also applicable to the server 6.

The personal computer 1 incorporates a CPU (Central Processing Unit) 51. To the CPU 51, an input/output interface 55 is connected through a bus 54. The input/output interface 55 is connected to the followings: an input block 56 based on input devices such as keyboard and mouse; an output block 57 for outputting a processing result such as audio signal for example; a display block 58 including a display monitor for displaying an image as a result of processing; a storage block 59 based on a hard disk drive for storing programs and constructed databases; a communication block 60 including a LAN (Local Area Network) card for communicating data through a network represented by the Internet; and a drive 61 for reading/writing data onto/from recording media such as a magnetic disk 62, an optical disk 63, a magneto optical disk 64, and a semiconductor memory 65. The bus 54 is connected to a ROM (Read Only Memory) 52 and a RAM (Random Access Memory) 53.

Programs stored in the recording media, the magnetic disk 62 through the semiconductor memory 65, are read by the drive 61 or acquired by the communication block 60 through a network to be installed in a hard disk drive incorporated in the storage block 59. The programs stored in the storage block 59 are loaded from the storage block 59 into the RAM 53 for execution as instructed by the CPU 51 in accordance with user commands entered through the input block 56.

The hard disk drive incorporated in the storage block 59 also stores application programs such as a WWW (World Wide Web) browser which is loaded from the storage block 59 into the RAM 53 for execution as instructed by the CPU 51 in accordance with user commands entered through the input block 56.

Figure 3:
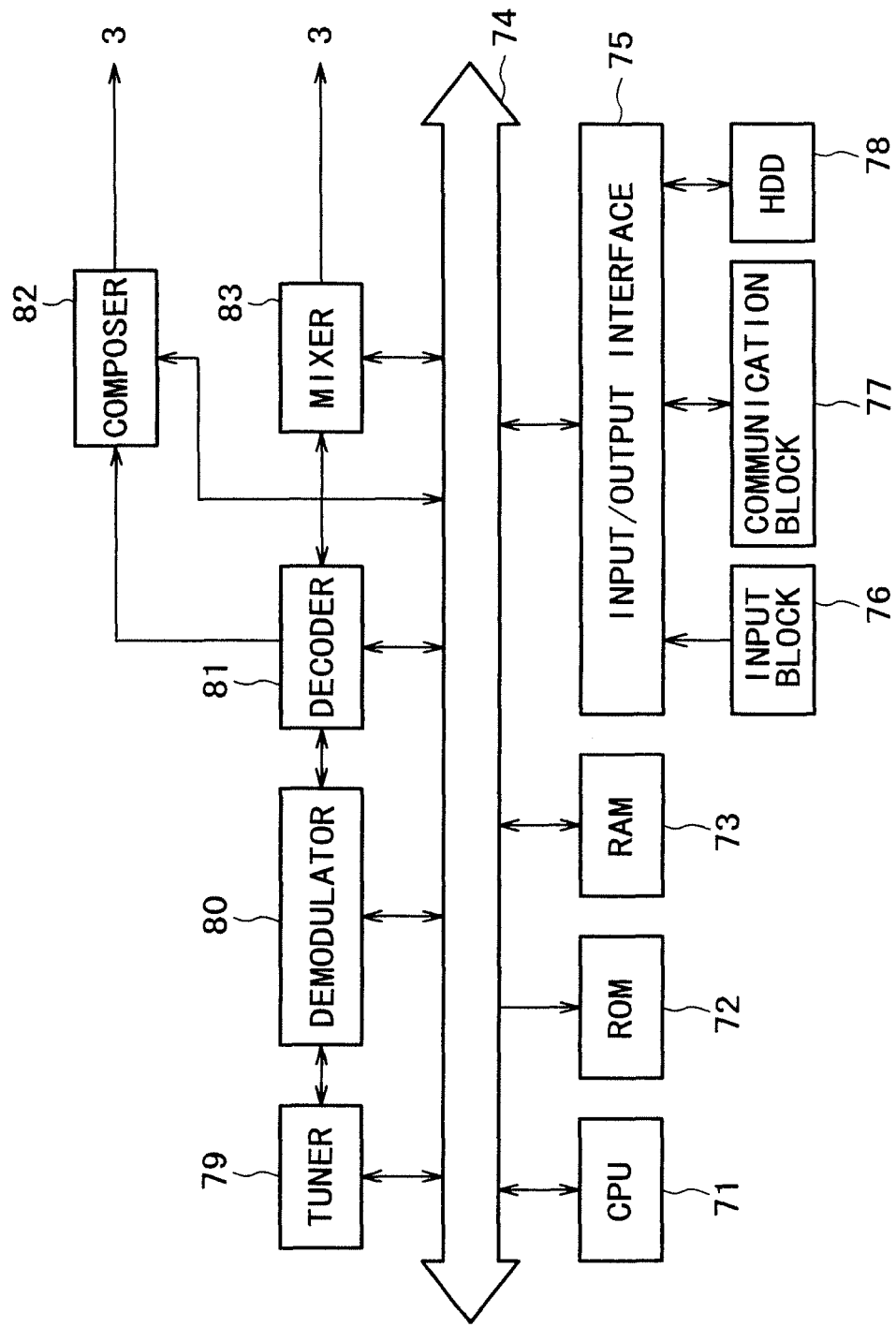
FIG. 3 is a block diagram illustrating an exemplary configuration of a HDD recorder shown in FIG. 1.

Referring to FIG. 3, there is shown a block diagram illustrating an exemplary configuration of the HDD recorder 2 1 or the HDD recorder 2 2. Because the HDD recorder 2 1 is the same as the HDD recorder 2 2 in configuration, they are generically called the HDD recorder 2 unless it is necessary to make a distinction between them. Likewise, the television receiver 3 1 and the television receiver 3 2 are generically called the television receiver 3 unless it is necessary to make a distinction between them. The HDD recorder 2 can record many pieces of video on a hard disk drive (HDD) 78 having a mass storage capacity and properly understand user's intention to reflect it on the recording management (such as a viewing log and an operation log) of recorded video. It should be noted that the HDD recorder 2 may be implementable as an AV device; for example, the HDD recorder 2 may be configured integrally with a television receiver such as a set top box (STB).

A CPU 71 is the main controller for controlling the operation of the entire HDD recorder 2. To be more specific, on the basis of input signals supplied through an input block 76, the CPU 71 controls a tuner 79, a demodulator 80, a decoder 81, and the HDD 78 for example to execute program recording and reproduction. The CPU 71 also acquires data of interest of the user to present program information (associated information).

A RAM 73 is a writable volatile memory in which an execution program of the CPU 71 is loaded and the data necessary for this program to run is stored. A ROM 72 is a read only memory for storing a self diagnosis and initialization program which is executed when the HDD recorder 2 is powered on, the control codes for operating the hardware for example.

The input block 76 is constituted of a remote commander, buttons, switches, or a keyboard for example. The input block 76 outputs input signals generated in accordance with user operations to the CPU 71 through an input/output interface 75 and a bus 74.

A communication block 77 communicates with the server 6 and the personal computer 1 through the network 5. The data inputted in the communication block 77 are appropriately recorded to the HDD 78 through the input/output interface 75.

The HDD 78 is a random accessible storage device which can store programs and data in a predetermined file format and has a huge storage capacity. The HDD 78 is connected to the bus 74 through the input/output interface 75, receives the data for data broadcast such as broadcast programs and EPG data from the decoder 81 or the communication block 77. The HDD 78 also records the received data, and outputs the recorded data as required. Also, the HDD 78 stores the user interest data generated in the CPU 71.

A broadcast wave received at an antenna, not shown, is supplied to the tuner 79. The broadcast wave is based on a predetermined format and includes EPG data for example. The broadcast wave may be any of satellite broadcast wave, ground wave, wired wave, or wireless wave.

Under the control of the CPU 71, the tuner 79 tunes in on, or selects, the broadcast wave of a predetermined channel and outputs the received data to the demodulator 80. It should be noted that, depending on whether the broadcast wave received is analog or digital, the configuration of the tuner 79 may be changed or extended appropriately. The demodulator 80 demodulates the digitally modulated received data and outputs the resultant data to the decoder 81.

For example, in the case of digital satellite broadcast, digital data received by the tuner 79 and demodulated by the demodulator 80 are a transport stream with AV data compressed by MPEG2 (Moving Picture Experts Group 2) and with data for data broadcast multiplexed. The former, the AV data consists of video data and audio data which constitute the body of each broadcast program. The latter, the data for data broadcast includes the data (for example, EPG data) which is accompanied with this broadcast program body.

The decoder 81 separates the transport stream supplied from the demodulator 80 into the AV data compressed by MPEG and the data for data broadcast (for example, EPG data). The separated data for data broadcast is supplied to the HDD 78 through the bus 74 and the input/output interface 75 and recorded to the HDD 78.

If an instruction is given to output the received program without change, the decoder 81 further separates the AV data into compressed video data and compressed audio data. The separated audio data is decoded and then outputted to the speaker of the television receiver 3 through a mixer 83. The separated video data is decompressed and then outputted to the monitor of the television receiver 3 through a composer 82.

If an instruction is given to record the received program to the HDD 78, the decoder 81 outputs the AV data before separation to the HDD 78 through the bus 74 and the input/output interface 75. If an instruction is given to reproduce a program recorded to the HDD 78, the decoder 81 receives the AV data from the HDD 78 through the input/output interface 75 and the bus 74, separates the received AV data into compressed video data and compressed audio data, and output these data to the composer 82 and the mixer 83 respectively.

The composer 82 composes the video data inputted from the decoder 81 with a GUI (Graphical User Interface) screen as required and outputs the composed data to the monitor of the television receiver 3.

Referring to FIG. 4, there is shown a block diagram illustrating an exemplary functional configuration of the CPU 51 shown in FIG. 2 or the CPU 71 shown in FIG. 3. In this example, there is arranged a metadata acquisition block 101 for acquiring the metadata about content from program information such as EPG and program information available on the Web or on air for example. The metadata herein denotes any data that contains the information on which content recommendation is made.

The metadata acquired by the metadata acquisition block 101 is transferred to a metadata analysis block 103. The metadata analysis block 103 analyzes the received metadata and transfers the result of the analysis to a dictionary data generation block 104. On the basis of the result of the analysis made by the metadata analysis block 103, the dictionary data generation block 104 generates the dictionary data which relate keywords with genres.

Also, the metadata acquired by the metadata acquisition block 101 is transferred to an associated information database generation block 102. The associated information database generation block 102 generates an associated information database 105 by referencing the dictionary data. It should be noted that, in this example, the associated information database is generated in a part of the CPU 71; actually, however, the associated information database is generated on the HDD 78 or the storage block 59 of the server 6. In the associated information database, the data acquired as metadata is classified by genre. The associated information database is configured of the associated information composed of the metadata associated with each piece of content.

An interest extraction block 106 extracts interest data from the entered information and transfers the extracted interest data to an associated information search block 107. On the basis of the received interest data, the associated information search block 107 searches the associated information database 105 for the associated information about the interest data. The associated information retrieved by the associated information search block 107 is outputted to the television receiver 3 by an associated information presentation block 108. An evaluation input block 109 accepts a user evaluation for the presented associated information, through the input block 76. The user evaluation is fed back to the interest extraction block 106 through the evaluation input block 109.

Figure 5:
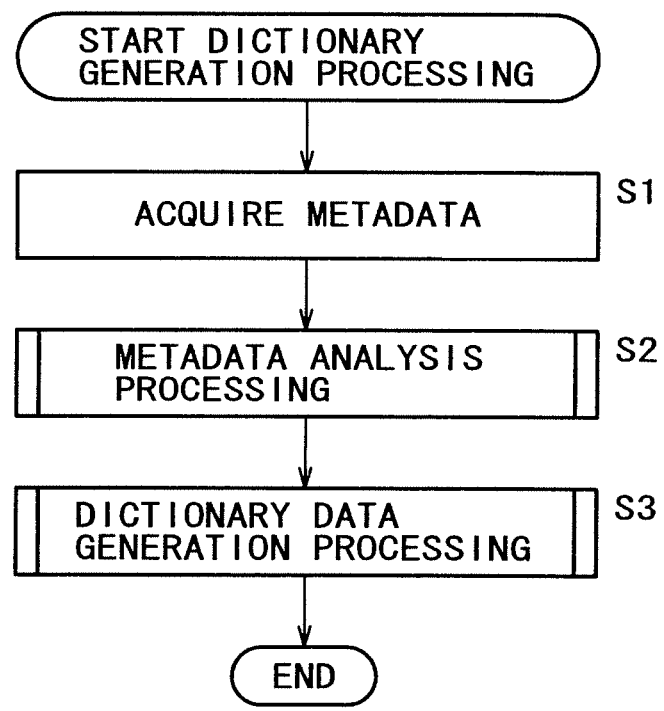
FIG. 5 is a flowchart describing dictionary generation processing.

The following describes the dictionary data generation processing of the HDD recorder 2 with reference to FIG. 5. This processing is executed periodically (once a month or once a year for example), upon demand by the user, or upon entry of new metadata.

In step S1, the metadata acquisition block 101 acquires metadata. At this moment, the metadata acquisition block 101 acquires the metadata about content from program information such as EPG and program information available on the Web. In step S2, the metadata analysis block 103 executes the metadata analysis processing to be described later with reference to FIG. 6. Consequently, the components constituting the metadata are extracted and stored as related with the genre of these metadata.

In step S3, the dictionary data generation block 104 executes the dictionary data generation processing to be described later with reference to FIG. 9. Consequently, dictionary data in which a keyword and a genre related thereto are generated.

Figure 6:
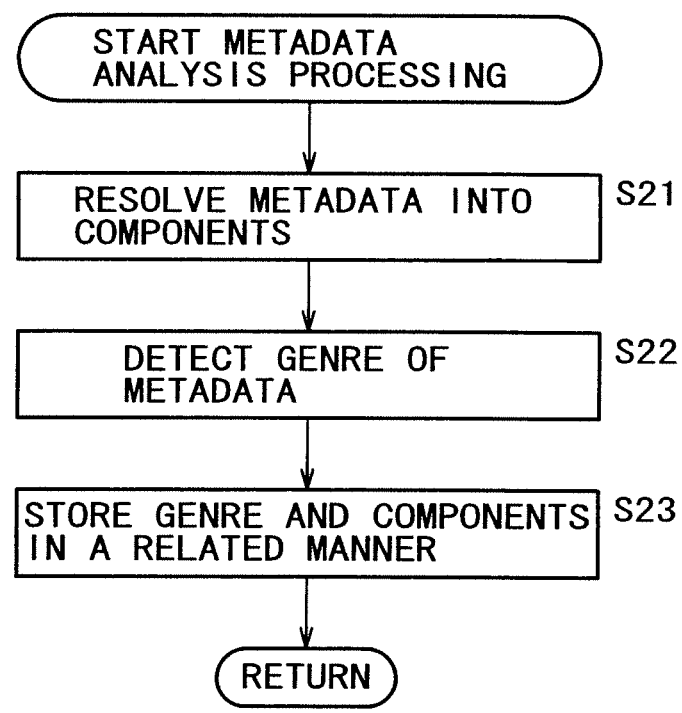
FIG. 6 is a flowchart describing metadata analysis processing.

The following describes the metadata analysis processing of step S2 shown in FIG. 5 with reference to FIG. 6. In step S21, the metadata analysis block 103 resolves the acquired metadata into components (or items). FIG. 7 shows an example of this metadata resolution.

In the example shown in FIG. 7, metadata are resolved into components (or items) "Genre", "Broadcast station", "Broadcast time zone", "Performer", and "Keyword". Component "Genre" is indicative of the genre of the content corresponding to the metadata. Component "Broadcast station" is indicative of the broadcast station from which the content corresponding to the metadata is broadcast. Component "broadcast time zone" is indicative of the time zone in which the content corresponding to the metadata is broadcast. Component "Performer" is indicative of the main performer who performs in the content corresponding to the metadata. Component "Keyword" is indicative of a predetermined word (for example, a noun) extracted from the text information which introduces the content corresponding to the metadata.

In the first metadata, component "Genre" is "Cooking", component "Broadcast station" is "TCS", component "Broadcast time zone" is "Afternoon", component "Performer" is "AAA", and component "Keyword" is "Recipe, Ingredients, Steps, Teletext Broadcasting, Stereo, . . . ".

In the second metadata, component "Genre" is "Living Information", component "Broadcast Station" is "MHK", component "Broadcast time zone" is "Evening", component "Performer" is "BBB", and component "Keyword" is "Leisure, Holiday Resort, Children, Teletext Broadcasting, Stereo, . . . ".

In the third metadata, component "Genre" is "Children", component "Broadcast Station" is "MHK", component "Broadcast time zone" is "Morning", component "Performer" is "CCC", component "Keyword" is "Leisure, Children, Teletext Broadcasting, Stereo, . . . ".

As described above, the metadata is resolved into components.

In step S22, the metadata analysis block 103 detects the genre of the metadata. In step S23, the metadata analysis block 103 relates genre and each component, and internally stores them on a temporary basis. At this moment, the metadata is collected for each genre and stored as arranged as shown in FIG. 8 for example.

In the example shown in FIG. 8, the metadata with component "Genre" described as "Cooking" is collected (or summarized). This metadata is resolved into the above mentioned components "Genre", "Broadcast Station", "Broadcast Time Zone", "Performer", and "Keyword". Likewise, the metadata with "Genre" described "Living Information" and the metadata with "Genre" described "Children" are collected and stored.

Thus, the components configuring metadata are collected and stored for each metadata genre.

Figure 9:
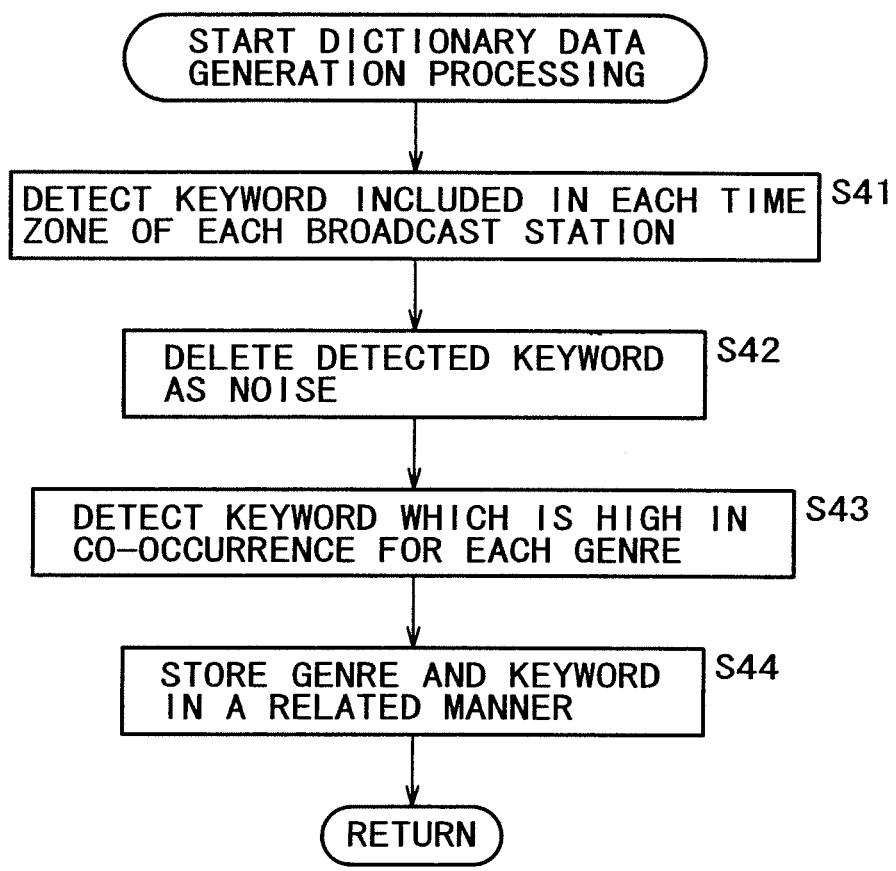
FIG. 9 is a flowchart describing dictionary data generation processing.

The following describes the dictionary data generation processing of step S3 shown in FIG. 5, with reference to FIG. 9. In step S41, the dictionary data generation block 104 detects a keyword commonly contained in each time zone of each broadcast station, from the metadata stored in step S23.

For example, "Teletext Broadcasting" and "Stereo" included in component "Keyword" shown in FIG. 7 are detected commonly in each time zone of each broadcast station (or channel). Any word (or keyword) that occurs commonly in each time zone of each broadcast station is regarded as a word not important in grasping the contents of content, namely, a noise. Therefore, the dictionary data generation block 104 deletes the keyword concerned as a noise in step S42.

It is also practicable to store beforehand the keywords corresponding to noise in an internal storage block (not shown) of the dictionary data generation block 104 thereby deleting, as noise, the same keywords (words) as those stored.

In step S43, the dictionary data generation block 104 detects keywords which are high in co occurrence for each genre. For example, "Recipe", "Ingredients", and "Steps" included in component "Keyword" shown in FIG. 8 are included in the first through third metadata in which "Genre" is classified as "Cooking". Such words (or keywords) are detected as keywords which are high in co occurrence in the metadata in which "Genre" is classified as "Cooking".

In step S44, the dictionary data generation block 104 relates each genre with keywords which are high in co occurrence in that genre and stores the related keywords as dictionary data.

Referring to FIG. 10, there is shown an example of the dictionary data to be stored at this moment. In this example, the dictionary data are configured of "Keyword", "Frequency/Month", "Genre", and "Other Components". "Keyword" describes keywords which are high in co occurrence detected in step S43. In this example, "Recipe", "Ingredients", "Steps" and so on are described. "Frequency/Month" describes the number of times that keyword was detected in one month. A keyword having a large value described in "Frequency/Month" is considered as a keyword which is currently popular.

"Genre" describes genres to which the keywords belong. For example, with the first keyword "Recipe", the second keyword "Ingredients", and the third keyword "Steps", "Genre" is described as "Cooking". In the fifth keyword "Holiday Resort", "Genre" is described as "Living Information". With the fourth keyword "Leisure" and the sixth keyword "Children", "Genre" is described as "Living Information" and "Children". This indicates that keyword "Leisure" (or "Children") is high in co occurrence in the metadata in which that genre is classified as "Living Information" and also high in co occurrence in the metadata in which that genre is classified as "Children".

"Other Components" describes components which are determined high in co occurrence in that genre as with that keyword.

In the above mentioned example, the dictionary data generation processing is executed on the HDD recorder 2. It is also practicable to execute this processing on the personal computer 1 or the server 6.

the following describes associated information database generation processing with reference to FIG. 11. This processing is executed when it is necessary to assign genre to metadata in the personal computer 1 or the HDD recorder 2, for example.

In step S61, the associated information database generation block 102 acquires the metadata transferred from the metadata acquisition block 101. In step S62, the associated information database generation block 102 determines whether a genre is assigned to the acquired metadata. If no genre is found assigned, then the associated information database generation block 102 detects the keyword of the metadata in step S63. In step S64, the associated information database generation block 102 determines whether a keyword has been found (or detected). If a keyword is found detected, then, in step S65, the associated information database generation block 102 searches the dictionary data by use of the detected keyword.

In step S66, the associated information database generation block 102 determines whether a matching keyword is contained in the dictionary data. If a matching keyword is found contained, then, in step S67, the associated information database generation block 102 acquires the genre corresponding to the acquired keyword. For example, if keyword "Recipe" is detected from the metadata assigned with no genre in step S63, then the genre corresponding to this keyword is found to be "Cooking" on the basis of the above mentioned dictionary data (the data generated on the basis of the metadata assigned with no genre) with reference to FIG. 10. Thereby "Cooking" is acquired as the genre corresponding to this metadata.

In step S68, the associated information database generation block 102 executes data description processing to be described later with reference to FIG. 12.

If no matching keyword is found in the dictionary data after step S68 or in step S66, then the associated information database generation block 102 determines whether there is any keyword not yet processed in step S69. If there is found any keyword detected in step S63 that has not been processed, then in step S70, the associated information database generation block 102 extracts that keyword not yet processed.

Subsequently, in step S66, the above mentioned processing is executed on the extracted keyword.

On the other hand, if the metadata are found assigned with a genre in step S62, then the associated information database generation block 102 acquires that genre in step S71 and executes the data description processing in step S68.

If no keyword is found in step S64 and if no other keywords are found in step S69, then the processing comes to an end.

Thus, the associated information database is generated on the basis of the acquired metadata. The metadata assigned with no genre are also assigned with that genre and stored in the associated information database.

Figure 12:
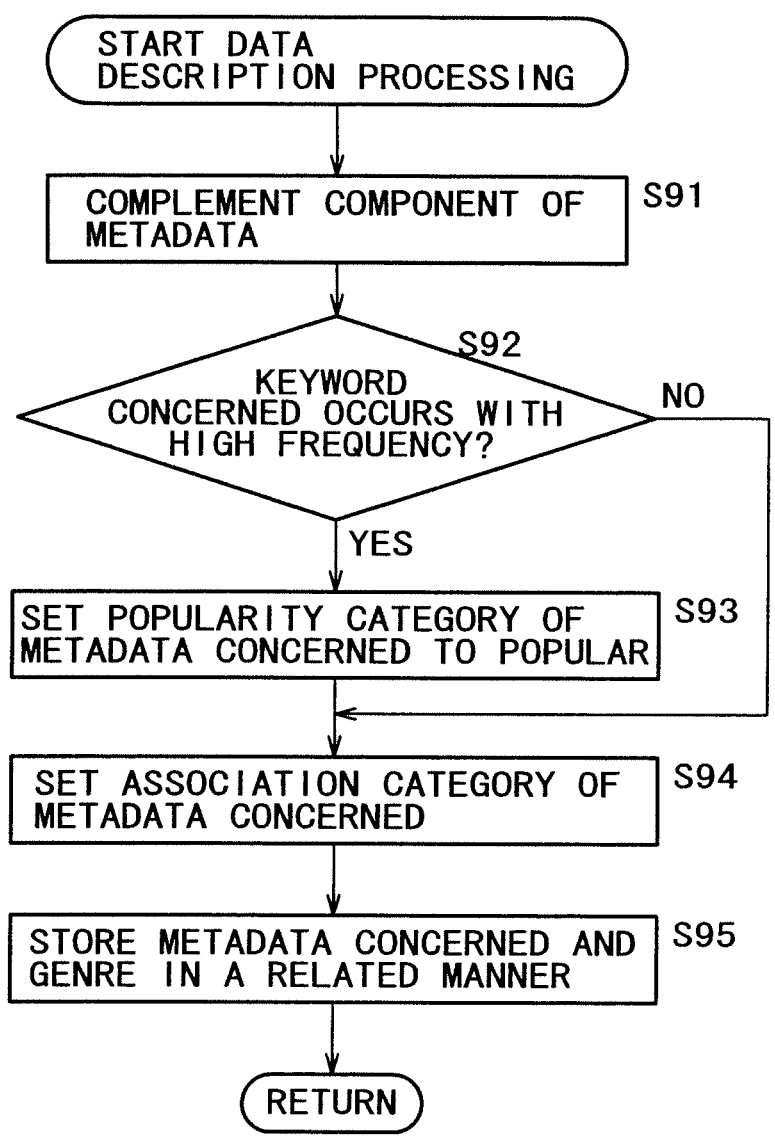
FIG. 12 is a flowchart describing data description processing.

The following describes the data description processing of step S68 shown in FIG. 11, with reference to FIG. 12. In step S91, the associated information database generation block 102 complements the components of metadata.

For example, if there is a plurality of metadata components, partially lacking components can be complemented by using an extracted combination in which the correlation with a particular component is extremely high and that with another component is extremely low. For example, assumed that there be A, B, C, D . . . X as metadata components and the attribute items (or attribute values) of these components be A1, A2, A3 for component A, B1, B2, B3, B4 for component B, C1, C2 for component C, and D1, D2, D3 . . . for component D.

For the already acquired metadata, the correlation between components can be checked by referencing "Other Components" of the dictionary data shown in FIG. 10. It is assumed here that there be a strong correlation only between A1 and B3 and between C2 and D2, and there be no correlation between the other components. Then, if the metadata of a certain new piece of content are acquired and if component A and D of the acquired metadata are not assigned, component B is B3 and component C is C2, then it is highly predictable that the components constituting the acquired metadata are A1, B3, C2, and D2.

Thus, on the basis of already assigned components B3 and C2, components A and D which have not yet assigned can be assigned, thereby metadata components are complemented. To be more specific, a component (or item) having a strong correlation with the genre and keyword (or component) acquired in the process of step S67 is newly generated in response to the acquired component, for example.

In step S92, the associated information database generation block 102 determines whether the keyword detected in step S63 occurs with a high frequency. At this moment, the value (FIG. 10) of "Frequency/Month" corresponding to the detected keyword is detected from the dictionary data, and if the detected value is equal to or more than a predetermined threshold (for example, 10), then it is determined that this keyword is a keyword having a high frequency.

If the keyword is found to have a high frequency in step S92, then the popularity category of that metadata is set to "popular" in step S93. Thus, arranging the popularity category for metadata, storing it beforehand as associated information, and generating a popular word dictionary by collecting only the metadata set as popular, allow the recommendation of popular pieces of content for the user by use of that associated information or the generated popular word dictionary.

On the other hand, if the keyword is found to have no high frequency in step S92, then the process of step S93 is skipped.

Also, if the frequency of keyword is stored in the associated information database 105 as monthly frequency information and the frequency of the keyword concerned is conspicuously greater than the frequency in another month, then the popularity category of the metadata concerned may be set to "popular".

Referring to FIG. 13, there is shown an example of the stored frequency information about keyword A and keyword B in January through April. In this example, the frequency of the most recent month (April in this example) is compared with the frequencies of the other months (the last three months) for example. If the frequency of April is found to be greater than the average of the frequencies of the last three months by more than a predetermined ratio (for example, 30%), then the popularity category of the metadata corresponding to the keyword concerned is set to "popular".

In the example shown in FIG. 13, the frequency (45) of keyword A in April is greater than the average ((12+15+11)/3=12.7) of the frequencies of the last three months by equal to or more than 30%, so that the popularity category of the metadata corresponding to keyword A is set to "popular". On the other hand, the frequency (48) of keyword B in April is not greater than the average ((48+50+51)/3=49.7) by equal to or more than 30%, so that the popularity category of the metadata corresponding to keyword B is not set to "popular" (denoting that keyword B is unpopular).

In step S94, the associated information database generation block 102 sets an association category indicative of the association between the metadata concerned and other metadata. For example, if keyword "Leisure" is detected in step S63, then the genre corresponding to keyword "Leisure" is "Living Information" or "Children". In this case, the genre of the metadata concerned is "Living Information" for example; a predetermined item (for example, A) is set to the association category of the metadata concerned as the information indicative that the genre is also associated with "Children".

Consequently, for the metadata (the second and third metadata shown in FIG. 7) in which "Leisure", "Children", or "Holiday Resort" is detected as the keyword, "A" is set to the association category as a new attribute. By doing so, in searching for associated information, the metadata in which "Leisure", "Children", or "Holiday Resort" is included as the keyword can all be searched by searching for the associated information with its association category being "A".

In step S95, the associated information database generation block 102 relates, with the genre, the metadata concerned in which the components are complemented and the popularity category and the association category are set. Then, the associated information database generation block 102 stores the resultant metadata as an associated information database.

Thus, the components of metadata are complemented or the popularity category is set, which is described to the associated information database. The associated information database may be stored in the storage block 59 of the personal computer 1 or the HDD 78 of the HDD recorder 2. Alternatively, the associated information database may be stored in the storage block 59 of the server 6.

Figure 14:
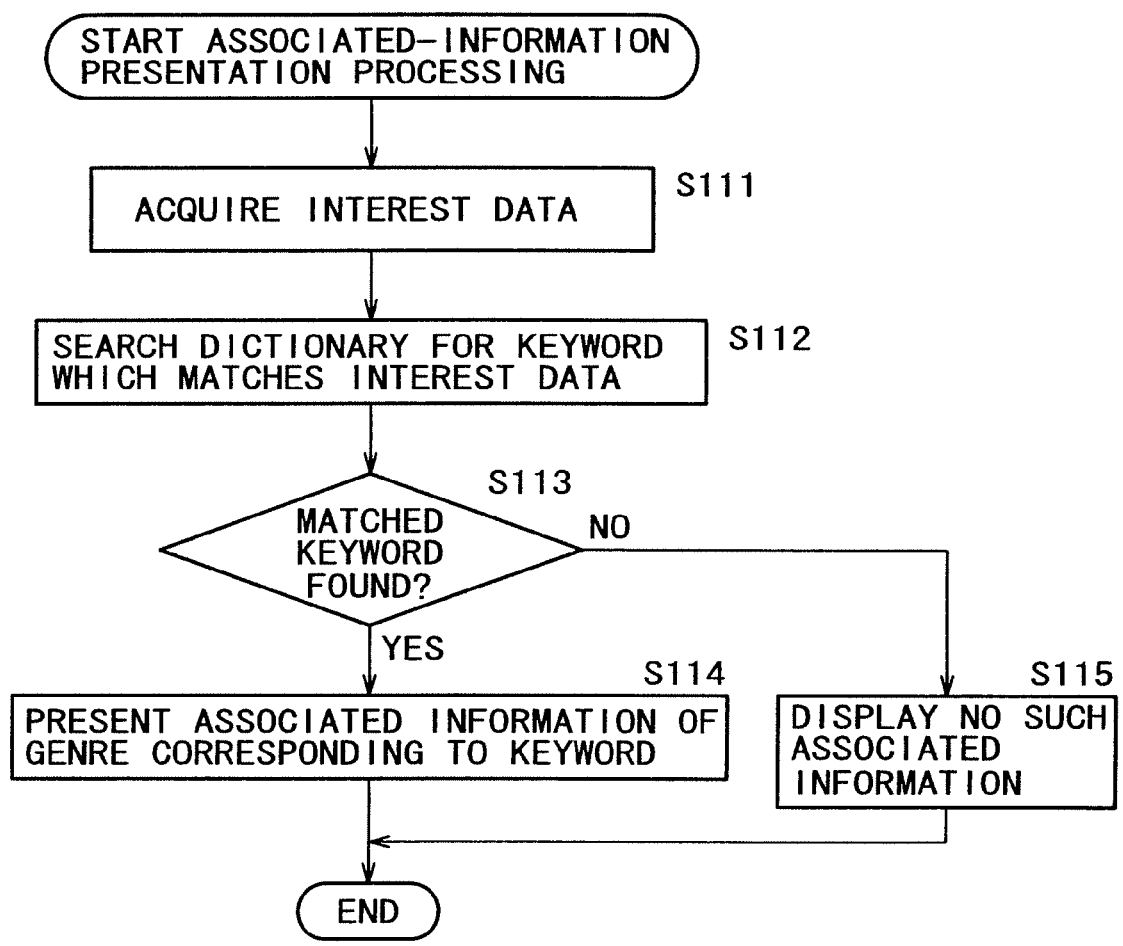
FIG. 14 is a flowchart describing associated information presentation processing.

The following describes associated information presentation processing with reference to FIG. 14. This processing is executed when an instruction for associated information presentation is given by the user on the personal computer 1 or the HDD recorder 2.

In step S111, the interest extraction block 106 acquires interest data and transfers the acquired interest data to the associated information search block 107. At this moment, the interest data generated in the personal computer 1 is transferred to the HDD recorder 2 1 and acquired by the interest extraction block 106, for example. The interest data generated in the personal computer 1 is generated on the basis of the information such as mail sent/received in the past, so that this interest data is not the data suitable for searching for content which is viewed by the HDD recorder 2 1.

Therefore, in step S112, the associated information search block 107 extracts a keyword from the interest data to search the dictionary data for the extracted keyword. In step S113, the associated information search block 107 determines whether there is a matching keyword in the dictionary data. If a matching keyword is found, then, in step S113, the associated information search block 107 makes the associated information database 105 search for the associated information of the genre corresponding to that keyword and present the retrieved associated information onto the associated information presentation block 108.

For example, in step S112, if keyword "Children" is extracted from the interest data, then the dictionary data shown in FIG. 10 is searched for the genre corresponding to keyword "Children". In the example shown in FIG. 10, the genre corresponding to keyword "Children" is "Living Information" and "Children". Therefore, in step S114, the metadata of the content classified as genre "Living Information" and the metadata of the content classified as "Children" are presented to the user as the associated information.

If no matching keyword is found in step S113, then the information that there is no associated information is presented on the associated information presentation block 108 in step S115.

It should be noted that a user evaluation for the presented associated information is entered from the evaluation input block 109 as required. On the basis of the entered user evaluation, the degree of importance of the interest data used for the presentation of associated information for example is changed.

Thus, the associated information is presented to the user. Consequently, even with the interest data assigned with no genre, the associated information classified into genres can be presented on the basis of such interest data. Further, not only the associated information classified as genre "Children" on the basis of keyword "Children", but also the associated information classified as "Living Information" which is a genre high in co occurrence of keyword "Children" can be presented.

In the above mentioned examples, a category to be assigned is a metadata component (step S91), a popularity category (step S93), an association category (step S94), or a genre (step S95); it will be apparent that any other categories may be assigned.

The above mentioned sequence of processes may be executed by hardware as well as software.

When the above mentioned sequence of processing operations is executed by software, the programs constituting the software are installed in a computer which is built in dedicated hardware equipment or installed, from a network or recording media, into a general purpose personal computer for example in which various programs may be installed for the execution of various functions.

It should be noted herein that the steps for describing each processing operation include not only the processing operations which are sequentially executed in a time dependent manner but also the processing operations which are executed concurrently or discretely. For example, the programs are installed from the recording media (magnetic disk 62, optical disk 63, magneto optical disk 64, and semiconductor memory 65) mounted to the drive 61 in FIG. 2.

As described and according to the invention, content can be recommended. Especially, even the metadata assigned with no classification can be used to recommend content to the user on the basis of these metadata.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus, comprising:
    an interface configured to acquire electronic programming guide (EPG) data transmitted from the information processing apparatus over a network, the EPG data including a plurality of metadata entries each including a plurality of keywords, a broadcast time zone, and a broadcast station;
    a processor configured to compare each of the plurality of metadata entries, discard any keywords from the plurality of metadata entries that occur commonly in each broadcast time zone of each broadcast station, extract a keyword from the keywords remaining as a result of the discarding, and associate each of the extracted keywords with a genre by searching stored dictionary data for a keyword matching the extracted keyword and assigning a genre associated with the keyword matching the extracted keyword to the extracted keyword; and
    a memory configured to store a result of the association, wherein
    the processor associates each of the extracted keywords with a genre, which is different from the extracted keywords, by searching stored dictionary data for a keyword matching the extracted keyword and assigning a genre, which is different from the extracted keyword, associated with the keyword matching the extracted keyword to the extracted keyword.

2. An information processing method performed by an information processing apparatus, the method comprising:
    acquiring, by an interface of the information processing apparatus, electronic programming guide (EPG) data transmitted from the information processing apparatus over a network, the EPG data including a plurality of metadata entries each including a plurality of keywords, a broadcast time zone, and a broadcast station;
    comparing, by a processor of the information processing apparatus, each of the plurality of metadata entries;
    discarding, by the processor of the information processing apparatus, any keywords from the plurality of metadata entries that occur commonly in each broadcast time zone of each broadcast station;
    extracting, by the processor of the information processing apparatus, a keyword from the keywords remaining as a result of the discarding;
    associating, by the processor of the information processing apparatus, each of the extracted keywords with a genre by searching stored dictionary data for a keyword matching the extracted keyword and assigning a genre associated with the keyword matching the extracted keyword to the extracted keyword; and
    storing, by a memory of the information processing apparatus, a result of the associating, wherein
    the associating includes associating each of the extracted keywords with a genre, which is different from the extracted keywords, by searching stored dictionary data for a keyword matching the extracted keyword and assigning a genre, which is different from the extracted keyword, associated with the keyword matching the extracted keyword to the extracted keyword.

3. A memory including a program, which when executed by a computer, causes the computer to perform an information processing method comprising:
    acquiring electronic programming guide (EPG) data transmitted from the computer over a network;
    comparing each of the plurality of metadata entries;
    discarding any keywords from the plurality of metadata entries that occur commonly in each broadcast time zone of each broadcast station;
    extracting a keyword from the keywords remaining as a result of the discarding;
    associating each of the extracted keywords with a genre by searching stored dictionary data for a keyword matching the extracted keyword and assigning a genre associated with the keyword matching the extracted keyword to the extracted keyword; and
    storing a result of the associating, wherein
    the associating includes associating each of the extracted keywords with a genre, which is different from the extracted keywords, by searching stored dictionary data for a keyword matching the extracted keyword and assigning a genre, which is different from the extracted keyword, associated with the keyword matching the extracted keyword to the extracted keyword.

* * * * *